(12) United States Patent
Tsai

(10) Patent No.: US 8,340,239 B2
(45) Date of Patent: Dec. 25, 2012

(54) DECODER AND METHOD FOR ADAPTIVELY GENERATING A CLOCK WINDOW

(75) Inventor: Tien-Ju Tsai, Tainan (TW)

(73) Assignee: Himax Media Solutions, Inc., Tainan County (TW)

( * ) Notice: Subject to any disclaimer, the term of this patent is extended or adjusted under 35 U.S.C. 154(b) by 532 days.

(21) Appl. No.: 12/651,983

(22) Filed: Jan. 4, 2010

(65) Prior Publication Data

US 2011/0164711 A1 Jul. 7, 2011

(51) Int. Cl.
H04L 7/02 (2006.01)
(52) U.S. Cl. ......................... 375/360; 375/361; 375/369
(58) Field of Classification Search .................. 375/360, 375/361
See application file for complete search history.

(56) References Cited

U.S. PATENT DOCUMENTS

| | | | | |
|---|---|---|---|---|
| 5,371,545 A * | 12/1994 | Tults | .............................. | 348/465 |
| 6,377,308 B1 * | 4/2002 | Cahill, III | ..................... | 348/461 |
| 6,922,446 B1 * | 7/2005 | Chouly et al. | ................ | 375/285 |
| 2002/0008776 A1 * | 1/2002 | Kuzumoto et al. | ........... | 348/468 |
| 2004/0223083 A1 * | 11/2004 | Grossman et al. | ............ | 348/465 |
| 2008/0074539 A1 * | 3/2008 | Lee | ............................... | 348/465 |

FOREIGN PATENT DOCUMENTS

EP 0572740 A1 12/1993

OTHER PUBLICATIONS

European Search Report, EP10150314, mailed Jun. 18, 2010.

\* cited by examiner

*Primary Examiner* — David Ometz
*Assistant Examiner* — Qutbuddin Ghulamali
(74) *Attorney, Agent, or Firm* — Stout, Uxa, Buyan & Mullins, LLP

(57) ABSTRACT

A decoder and related method adaptively generate a clock window. A falling edge of a horizontal synchronization signal is detected, and the time difference between an actual frame code and a predefined frame code is determined. The beginning and the end of the clock window are then adaptively determined based on the falling edge and the time difference, such that symbol timing recovery through received clock run-in signals may be performed within the generated clock window.

7 Claims, 7 Drawing Sheets

| FIG. 5A |
| FIG. 5B |

DECODER AND METHOD FOR ADAPTIVELY GENERATING A CLOCK WINDOW

BACKGROUND OF THE INVENTION

1. Field of the Invention

The present invention generally relates to communications, and more particularly to dynamic clock window adaption in a video decoder.

2. Description of Related Art

In a conventional analog broadcast television system, such as one using a NTSC (National Television System Committee), PAL (Phase Alternating Line) or SECAM (Séquentiel couleur a mémoire or Sequential Color with Memory) format, the transmitted video consists of a sequence of still pictures or frames. For example, the NTSC protocol specifies about 30 frames per second, while the PAL/SECAM schemes specify 25 frames per second. Each frame consists of hundreds of horizontal scan lines. For example, each frame in the NTSC arrangement consists of 525 scan lines, among which the odd-numbered lines form an odd field and the even-numbered lines form an even field. The scan lines in each frame consist of not only video information but also vertical synchronization information, which is transmitted during a vertical blanking interval (VBI). For example, the scan lines 1-22 in the NTSC system are vertical-synchronization lines for the odd field, and the scan lines 263-285 are vertical-synchronization lines for the even field. The vertical-synchronization lines are used for synchronization and equalization and carry no video information.

The VBI is needed in conventional analog broadcast television systems to allow magnetic coils to deflect the electron beam vertically in a cathode ray tube (CRT). Although no such need exists in modern digital televisions, the VBI, however, still exists in modern digital broadcast television systems for carrying supplemental information (commonly called datacasting), such that extra information other than the actual video information may be provided to viewers. Various kinds of information may be broadcasted during the VBI such as Teletext, Vertical Interval Time Code (VITC), closed captioning (CC), Copy Generation Management System (CGMS), Widescreen Signaling (WSS), Video Programming System (VPS), etc.

At the receiving end (e.g., at a digital television), a demodulator demodulates the received modulated signals, followed by a video decoder performing synchronization and information recovery. FIG. 1 is a block diagram of a video decoder, which includes, among other things, a horizontal synchronizer 10, a vertical synchronizer 12, and a VBI decoder 14. After the horizontal synchronizer 10 and the vertical synchronizer 12 have achieved respectively horizontal and vertical synchronization with the received video signals and, accordingly, generated a horizontal synchronization signal (HSync_Timing) and vertical synchronization signal (VSync_Timing), the VBI data (VBI_Word_Data) may be retrieved and recovered by the VBI decoder 14.

According to a VBI-related protocol and with reference to the known Open System Interconnection (OSI) model defining communications in terms of layers such as a data-link layer, a preamble, or a clock run-in, and a frame code, or a start-of-frame delimiter (SFD), are incorporated by the data-link layer preceding a data body that contains the transmitted VBI information. FIG. 2 is an exemplary waveform of such a transmitted packet. The preamble is used to assist the receiver in performing, for example, the signal level/channel estimation and synchronization. In addition, the frame code is used in the receiver to determine the beginning of the data body.

After the preamble is horizontally synchronized, the receiver defines and generates a clock window, or a timing window. During the active period of the clock window, symbol timing recovery for the clock run-in may be performed to recover the timing, or the clock, of the received video signal. In other words, the symbol timing recovery of the clock run-in is enclosed by the clock window. FIG. 3 illustrates a clock window (CLK_Win) along with a received packet. As shown, the clock run-in typically begins running at a time after time T1_typ has elapsed from the falling edge of the horizontal synchronization (HSync_Timing). In an exemplary Teletext System-B, the length of T1_typ may be 10.1982 μs. Further, the clock run-in typically lasts for time T2_typ, and the frame code typically lasts for time T3_typ, with T2_typ and T3_typ being as long as 16 symbols and 8 symbols respectively in the exemplary Teletext System-B and with the predefined symbol time being 0.1441441 μs. T2 and T3 add up to T4 (i.e., 24 symbols), and T1 and T4 add up to T5. The below Table 1 shows the minimum, typical, and maximum values of the timing constraints T1 to T4 according to an exemplary system.

TABLE 1

| Timing constraint | Minimum (μs) | Typical (μs) | Maximum (μs) |
|---|---|---|---|
| T1 | (10.1982 − 1.0) | 10.1982 | (10.1982 + 0.4) |
| T2 | 16 * (0.1441405) | 16 * (0.1441441) | 16 * (0.1441477) |
| T3 | 8 * (0.1441405) | 8 * (0.1441441) | 8 * (0.1441477) |
| T4 | 24 * (0.1441405) | 24 * (0.1441441) | 24 * (0.1441477) |

In Table 1, the symbol time 0.1441405 μs for the minimum timing constraints and the symbol time 0.1441477 μs for the maximum timing constraints are determined according to acceptable deviation(s) of the symbol times among radio-frequency (RF) channels. Specifically, in the exemplary system, it is assumed that the proportion of the minimum/maximum deviation with respect to the predefined symbol time is 250 parts-per-million (ppm). Therefore, the minimum/maximum deviation is 0.0000036, that is 0.1441441*250 ppm. Accordingly, the symbol time for the minimum timing constraints is 0.1441405 μs, that is (0.1441441−0.0000036) μs, and the symbol time for the maximum timing constraints is 0.1441477 μs, that is (0.1441441+0.0000036) μs.

Given considerations to various variations for a variety of distinct transmitters, normally, the clock window is asserted at a time after the minimum T1 (T1_min) has elapsed from the falling edge of the horizontal synchronization (HSync_Timing), and becomes de-asserted at a time after the maximum T1 plus the maximum T2 have elapsed from the falling edge of the horizontal synchronization (HSyn_Timing). Although such a loose and fixed-sized clock window may usually ensure that any clock run-in is covered within the clock window, the performance of the symbol timing recovery is, however, ineffective, particularly when the signal-to-noise ratio (SNR) of the received data is not sufficiently high.

For the reason that the conventional clock window could not effectively facilitate symbol timing recovery for the clock run-in, a need has arisen to propose a novel scheme that may adaptively provide a proper, dynamic and thus more noise-immune clock window for symbol timing recovery.

SUMMARY OF THE INVENTION

In view of the foregoing, it is an object of the present invention to provide a decoder and method for adaptively generating a clock window that may be adaptively adjusted to facilitate symbol timing recovery for any of a variety of distinct transmitters.

According to one embodiment, a falling edge of a horizontal synchronization signal is detected, and the time difference between an actual frame code and a predefined frame code is determined. The beginning and the end of the clock window are then adaptively determined based on the falling edge and the time difference, such that symbol timing recovery through received clock run-in signals may be performed within the generated clock window.

According to another embodiment, the decoder primarily includes a frame code searching unit, a clock window generator, and a symbol timing recovery unit. The frame code searching unit searches for a match between a predefined frame code and received data bits, and then generates a frame code control signal when the predefined frame code is matched. The clock window generator determines the beginning and the end of the clock window based on a falling edge of a horizontal synchronization signal and the frame code control signal, and determines the time difference between an actual frame code and the predefined frame code. The symbol timing recovery unit performs symbol timing recovery through the received clock run-in signals within the generated clock window.

DETAILED DESCRIPTION OF THE INVENTION

Figure 4:
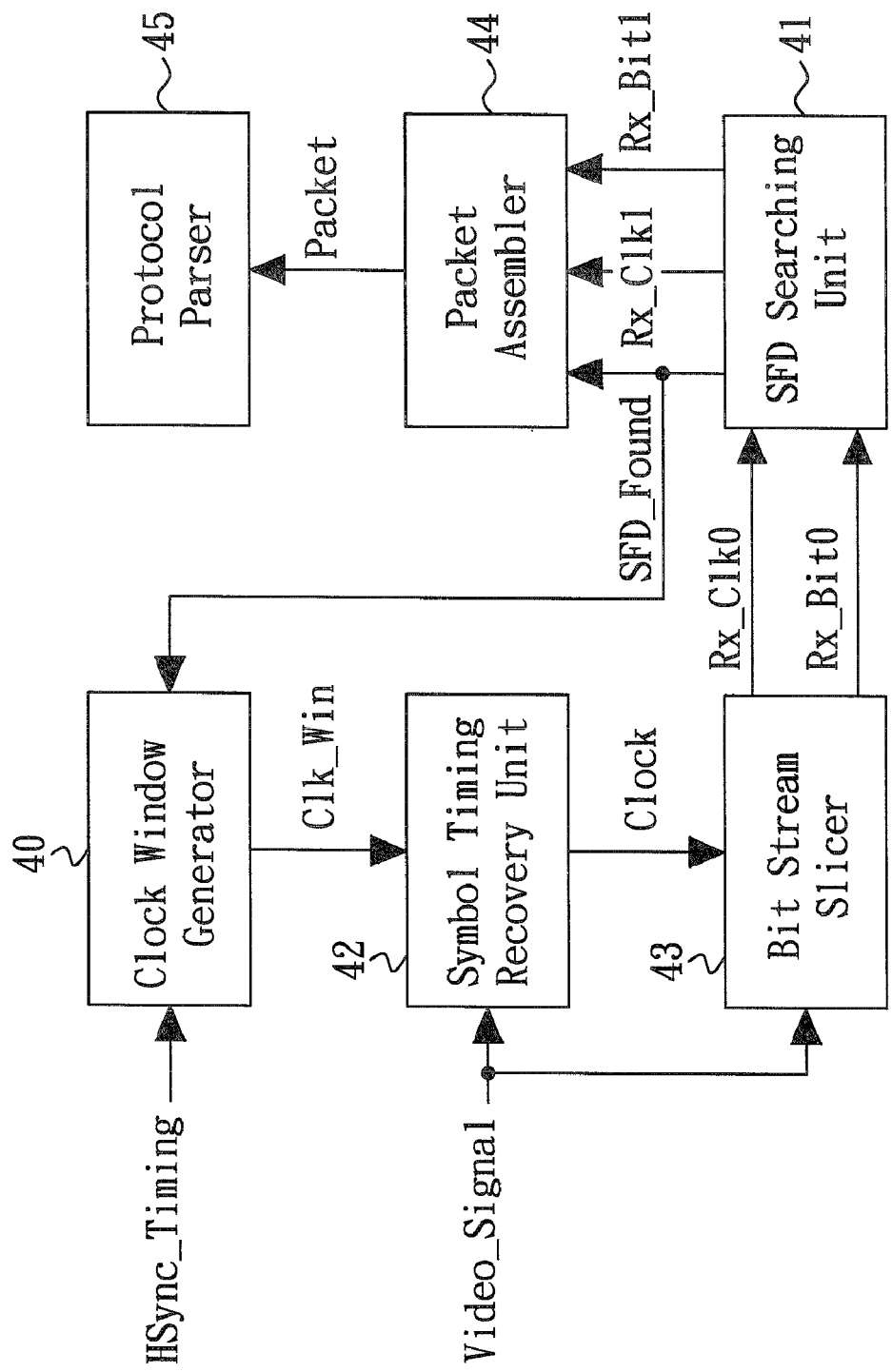
FIG. 4 shows a block diagram of a video decoder according to one embodiment of the present invention.

Turning to the drawings, shown in FIG. 4 according to one embodiment of the present invention is a block diagram of a vertical blanking interval (VBI) decoder. The embodiment illustrated here is suitable for use in recovering VBI data both in a digital receiver and in a general receiver of a typical telecommunication context.

In the embodiment, a clock window generator 40 adaptively generates a clock window (CLK_Win) according to a horizontal synchronization signal (HSync_Timing) and a frame-code control signal (SFD_Found) from a frame-code (start-of-frame delimiter, or SFD) searching unit 41. In the embodiment, the frame-code control signal (SFD_Found) is asserted or generated when the match between the received data bits and a predefined SFD pattern has been found. The clock window generator 40 will be described in detail later in this specification. The SFD searching unit 41 performs a full or a partial matching between the predefined SFD pattern and received data bits (Rx_Bit0). Some implementations of the SFD searching unit 41 are disclosed in co-pending U.S. patent application Ser. No. 12/618,953, filed on Nov. 16, 2009 and entitled "Method and System of Receiving Data with Enhanced Partial Matching," which is assigned to the same assignee and the entire disclosure of which is hereby incorporated by reference.

After determining the clock window (CLK_Win), a symbol timing recovering unit 42, such as a local oscillator, recovers the timing, or the clock, of the received video signal (Video_Signal) accordingly. The recovered clock, labeled as 'Clock', is provided to a bit stream slicer 43 for converting the received video signal (Video_Signal) to the data bits (Rx_Bit0) and associated data clock (Rx_Clk0). Some exemplary circuits of the bit stream slicer 43 are disclosed in U.S. patent application Ser. No. 12/498,345, filed on Jul. 6, 2009 and entitled "Method and System of Receiving Data with Enhanced Error Correction," which is assigned to the same assignee and the entire disclosure of which is hereby incorporated by reference.

After the frame-code match occurs, data (Rx_Bit1), such as VBI data, are retrieved from the data body and then packed into packets by a packet assembler 44. Subsequently, a protocol parser 45, usually in a data link-layer of the above-mentioned Open System Interconnection (OSI) model, interprets the packets and performs further functions, such as error detection and/or correction on the packets.

Figures 5, 5A:
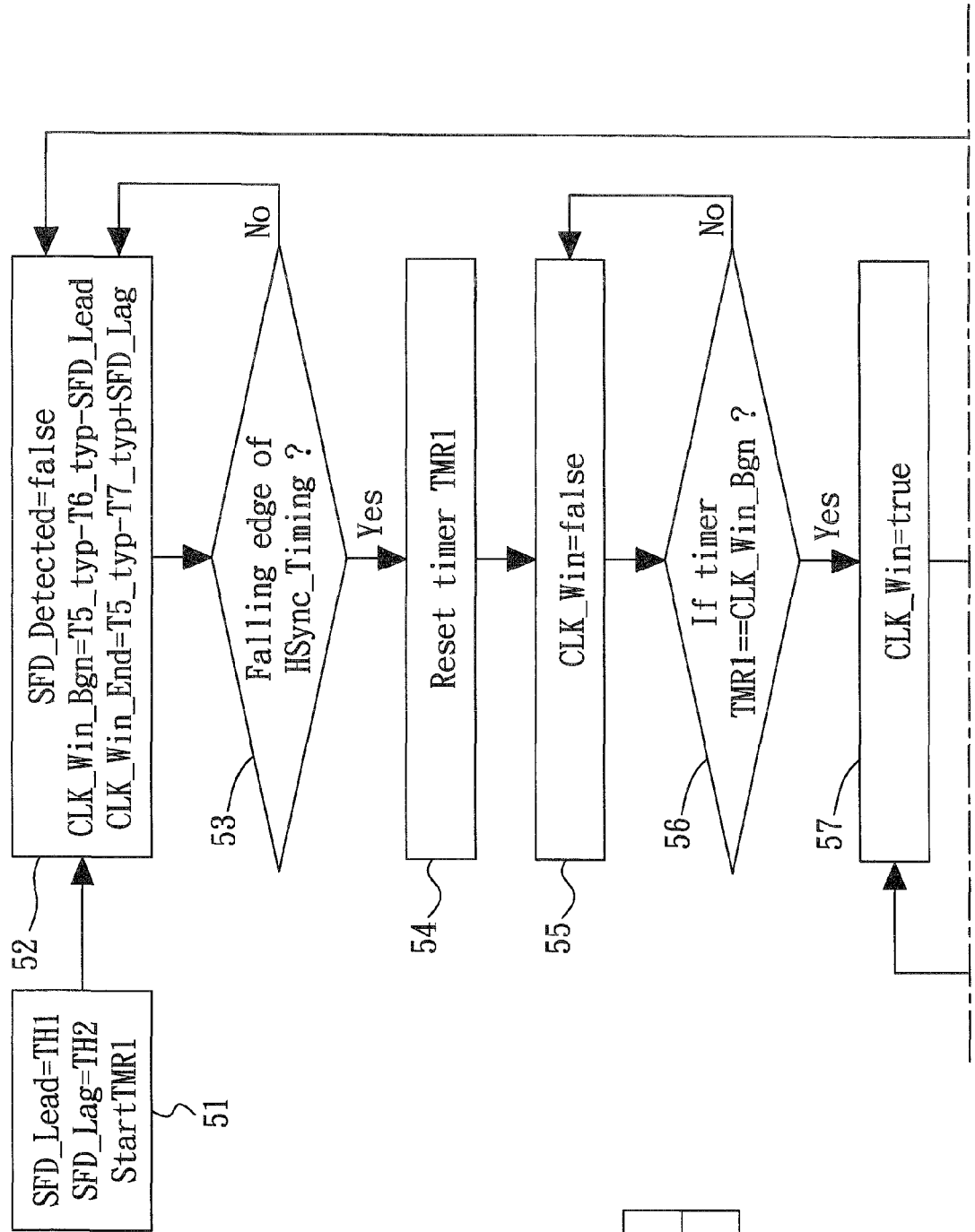
FIGS. 5A and 5B show a flow diagram of adaptively generating a clock window.
Figure 5B:
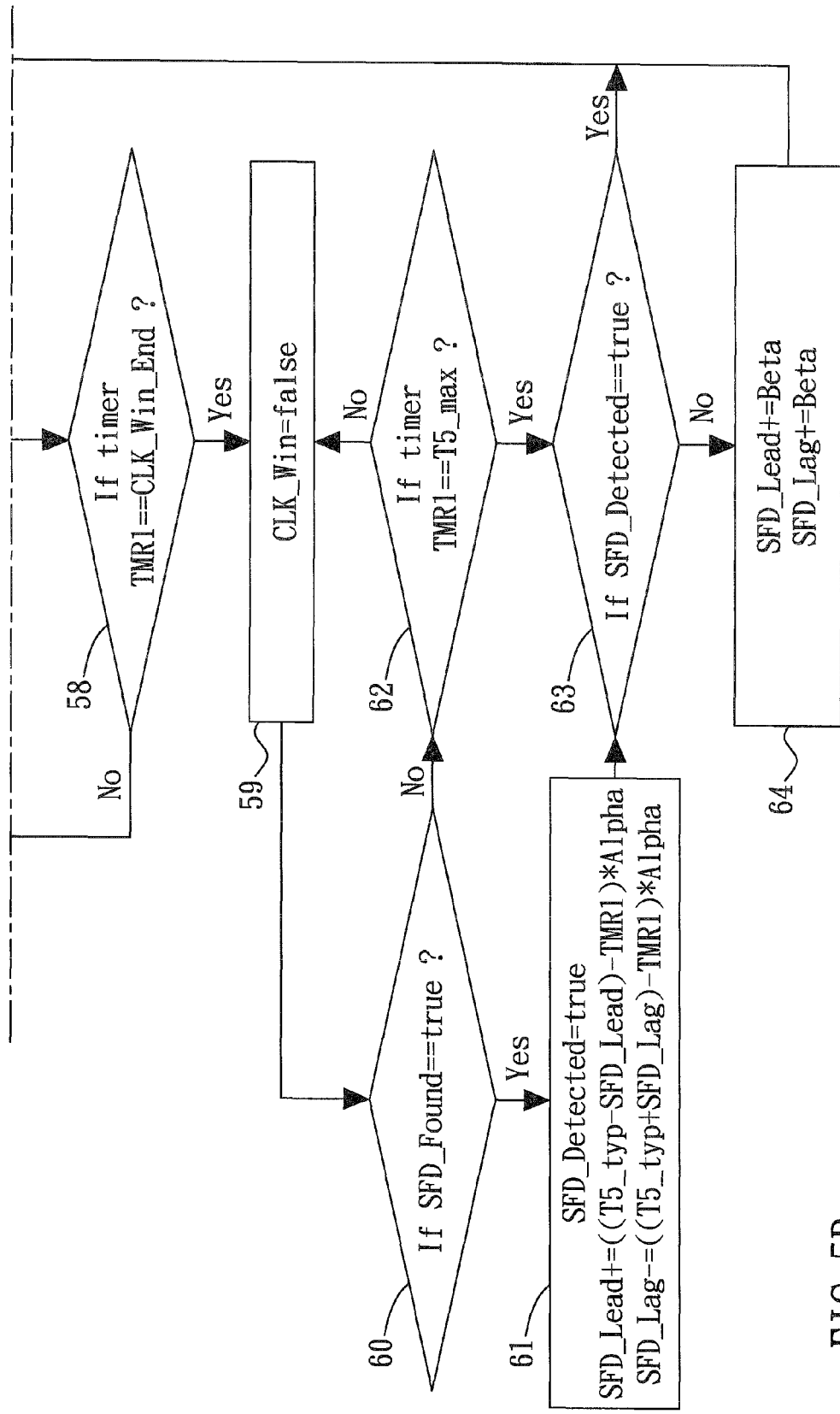
Figure 6:
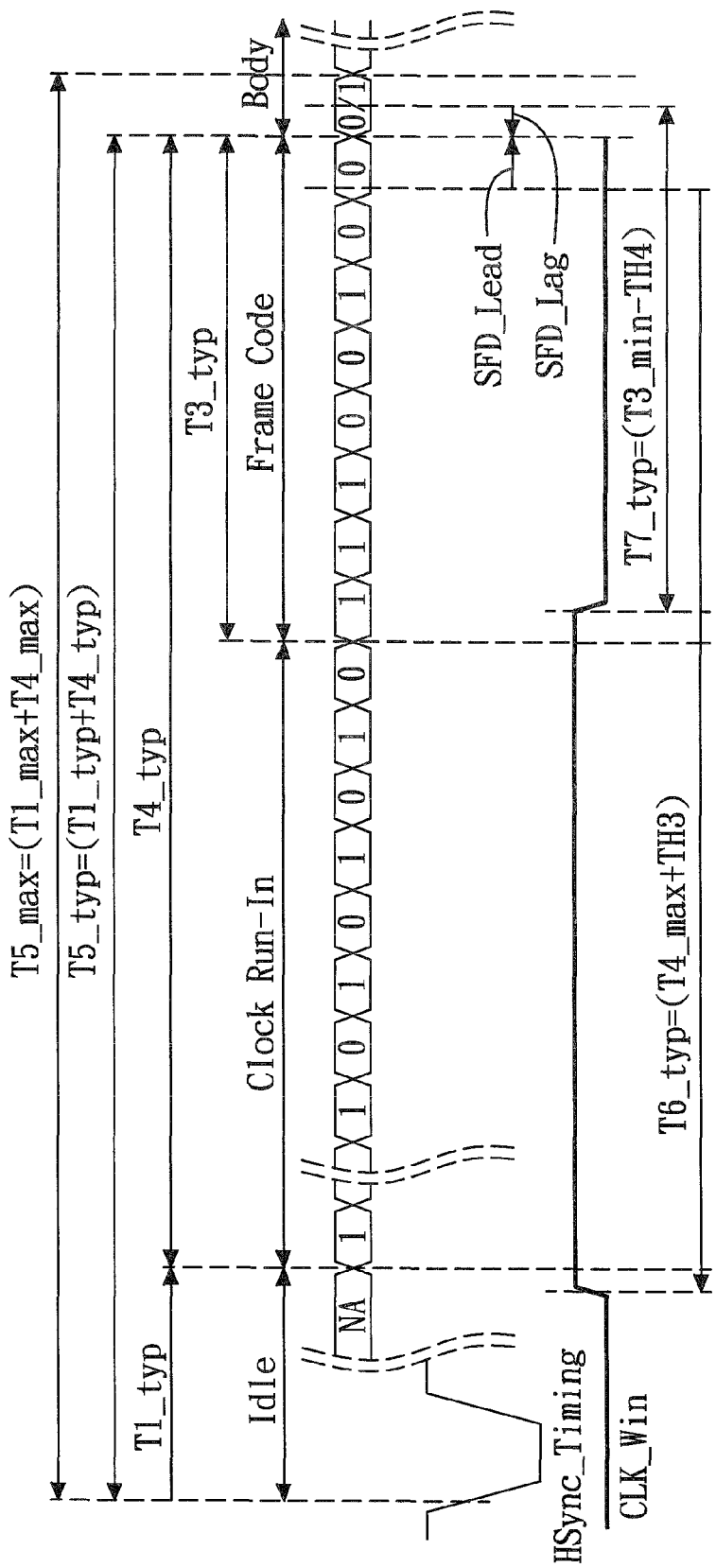
FIG. 6 shows an exemplary received packet and the clock window (CLK_Win) accompanying the flow of FIG. 5.

According to one aspect of the present embodiment, the clock window (CLK_Win) may be adaptively generated according to the flow diagram illustrated in FIG. 5. Illustrated in FIG. 6 is an exemplary received packet and the clock window (CLK_Win) accompanying the flow of FIG. 5. The timing constraints listed in the above Table 1 may also be adapted to FIG. 6. As used herein, "max" represents "maximum," "typ" represents "typical" and "min" represents "minimum."

In step 51, the variable SFD_Lead and the variable SFD_Lag are initialized with constant values TH1 and TH2, respectively. In the present embodiment, the variable SFD_Lead is used to represent the lead time of a leading actual SFD (i.e., leading SFD) ahead of an ideal or a predefined SFD, and the variable SFD_Lag is used to represent the lag time of the actual SFD (i.e., lagging SFD) behind the ideal or predetermined SFD. The variables SFD_Lead and SFD_Lag may be regarded as time differences between the actual SFD and the predefined SFD or the error signals of the actual SFD regarding the predefined SFD. It is noted that step 51 may be performed, for example, when the system is reset, or when the data source or the RF channel changes.

Afterward, in step 52, the beginning of the clock window (CLK_Win_Bgn) and the end of the clock window (CLK_Win_End) are defined as follows:

$$CLK\_Win\_Bgn = T5\_typ - T6\_typ - SFD\_Lead, \text{ and}$$

$$CLK\_Win\_End = T5\_typ - T7\_typ + SFD\_Lag,$$

with T6 being defined as T4_max+TH3 and lasting from the beginning of the clock window (CLK_Win) until the end of the leading SFD and with T7 being defined as T3_min−TH4 and lasting from the end of the clock window (CLK_Win) until the end of the lagging SFD. TH3 and TH4 are constants. Both the beginning of the clock window (CLK_Win_Bgn) and the end of the clock window (CLK_Win_End) refer to the falling edge of the horizontal synchronization (HSync_Timing). A detected-SFD flag (SFD_Detected) is de-asserted in step 52. The detected-SFD flag (SFD_Detected) will be used later in the process flow.

Figure 1:
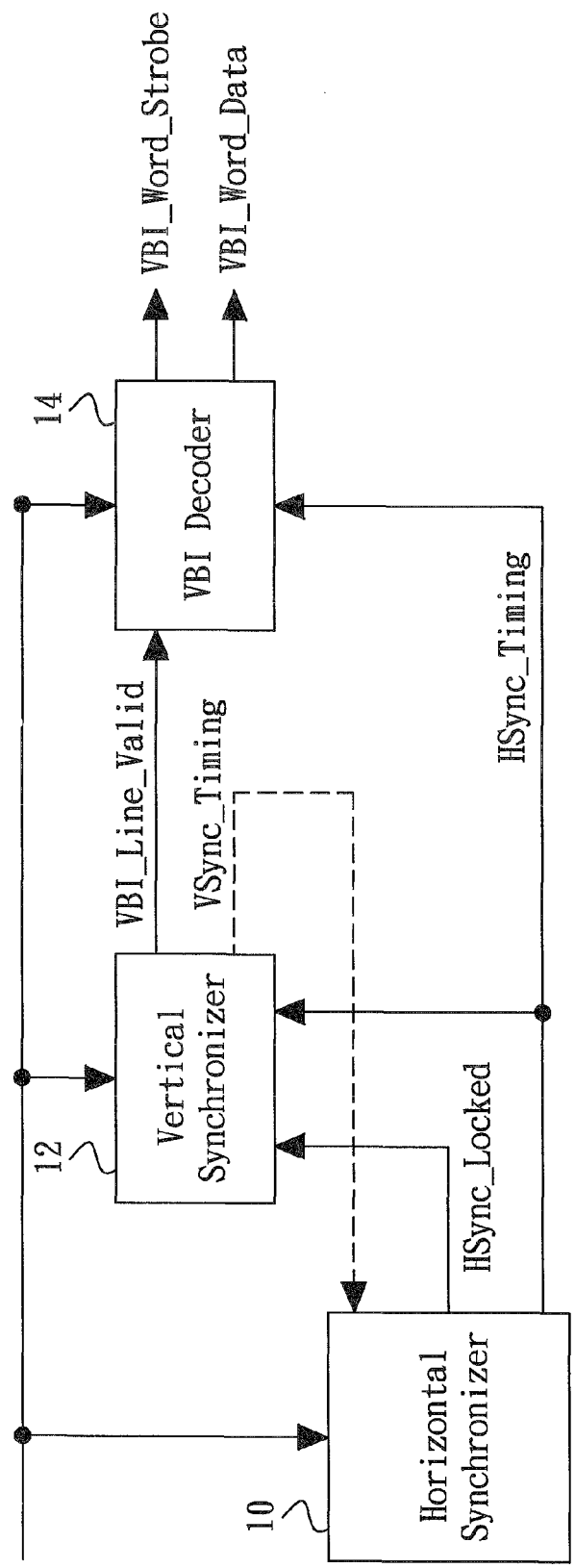
FIG. 1 shows a block diagram of a conventional video decoder.
Figure 2:
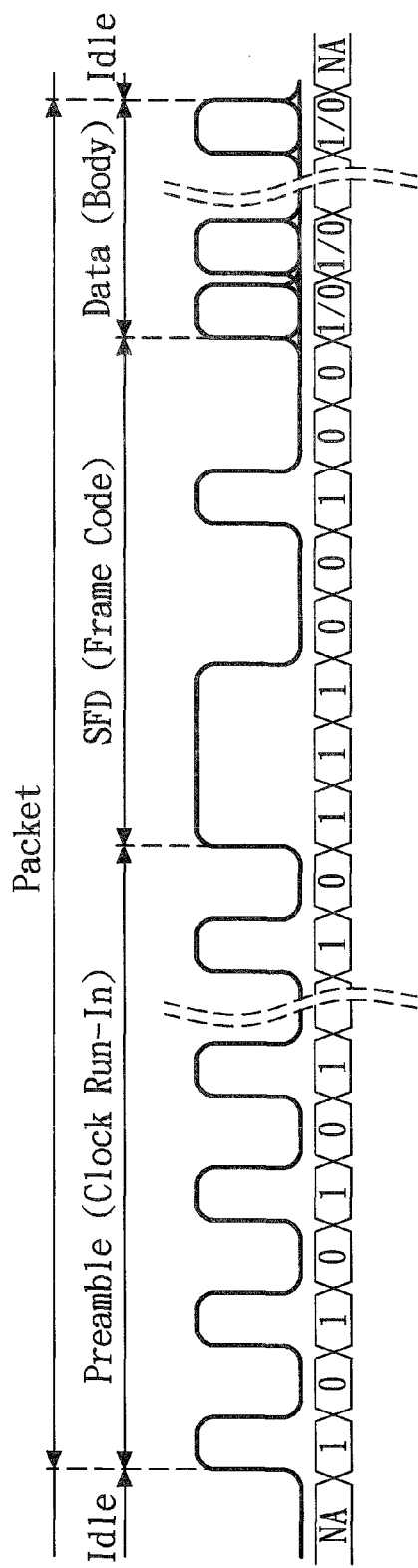
FIG. 2 shows an exemplary waveform of a conventional transmitted packet.
Figure 3:
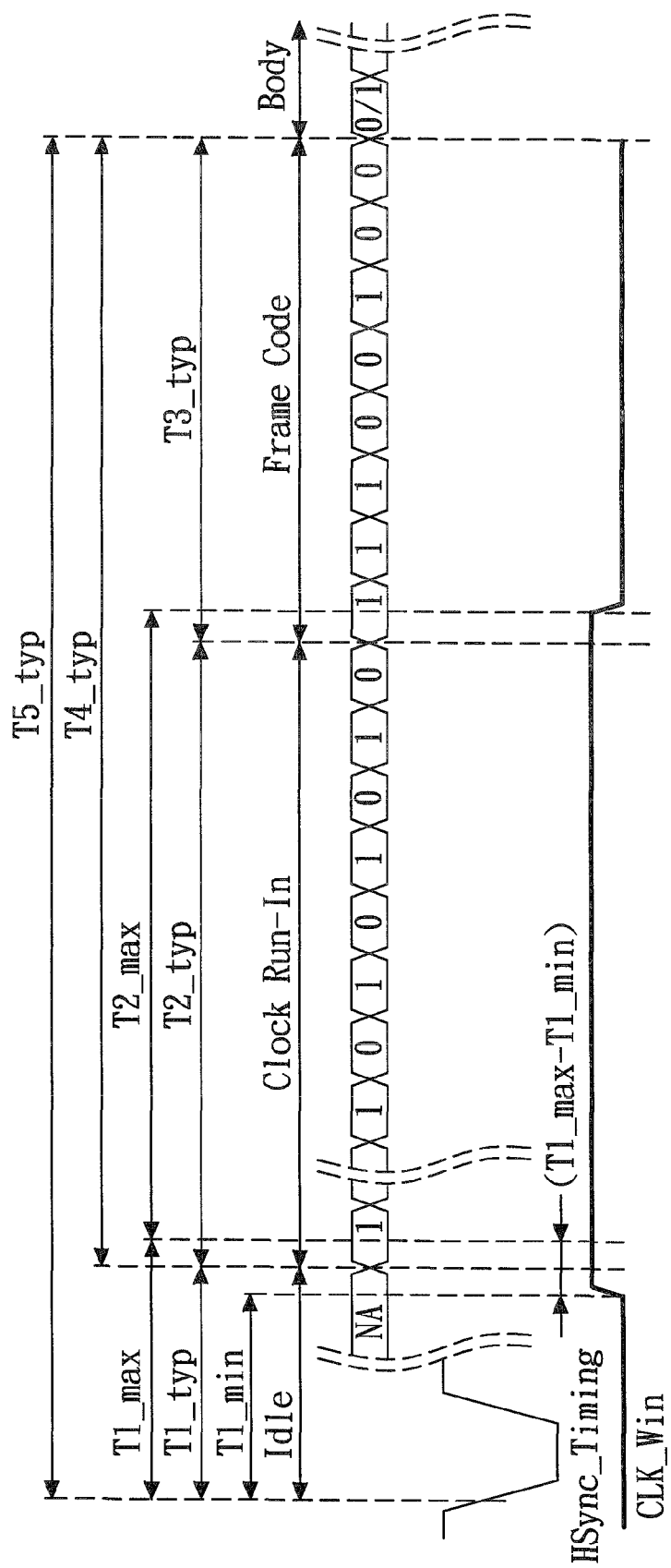
FIG. 3 shows a conventional clock window (CLK_Win) along with a received packet.

As the variables SFD_Lead and SFD_Lag vary, through the reception cycles, in response to swings of the actual (real) SFDs, the beginning of the clock window (CLK_Win_Bgn) and the end of the clock window (CLK_Win_End) may then adaptively and correctly be adjusted based on previous values of the variables SFD_Lead and SFD_Lag accordingly. Furthermore, utilizing some statistical method such as, but not limited to, a least mean square (LMS) algorithm, the variables SFD_Lead and SFD_Lag may converge after a couple of reception cycles, thereby generating an optimal or near-optimal clock window (CLK_Win) that exactly and just covers the period of clock run-in, or covers the period of clock run-in with an acceptable additional tolerance range. The optimal or near-optimal clock window (CLK_Win) generated by the present invention has a width tighter than that of a typical conventional one as shown in FIG. 3. Those skilled in the art know that as the width of the clock window decreases, it is less affected by noise. In addition, the training period is finite and useful in data recovery. As the length of the clock window increases, however, fewer cycles are left for other training process. Therefore, the present invention is able to provide a clock window that is more noise-immune and effective at utilizing training sequences than the prior art.

Further, it is noted that, in the embodiment, the variable SFD_Lead is used to adaptively adjust the beginning of the window clock (CLK_Win_Bgn) with the variable SFD_Lag being used to adaptively adjust the end of the window clock (CLK_Win_End). However, it is appreciated by those skilled in the pertinent art that a single variable may be used instead, in another embodiment, to adaptively adjust the beginning or the end of the clock window (CLK_Win). For example, in an alternative embodiment, a single variable SFD_Lead is used to adaptively adjust the beginning of the window clock (CLK_Win_Bgn) while the entire length of the clock window (CLK_Win) is kept constant. The beginning of the clock window (CLK_Win_Bgn) and the end of the clock window (CLK_Win_End) may be defined as follows:

$$CLK\_Win\_Bgn = T5\_typ - T6\_typ - SFD\_Lead, \text{ and}$$

$$CLK\_Win\_End = CLK\_Win\_Bgn + T2\_max,$$

with T2_max being a predefined maximum timing constraint lasting from the beginning of the clock window until the end of the clock window.

In a further embodiment, a single variable SFD_Lag is used to adaptively adjust the end of the window clock (CLK_Win_End) while the entire length of the clock window (CLK_Win) is kept constant. The beginning of the clock window (CLK_Win_Bgn) and the end of the clock window (CLK_Win_End) may be defined as follows:

$$CLK\_Win\_End = T5\_typ - T7\_typ + SFD\_Lag, \text{ and}$$

$$CLK\_Win\_Bgn = CLK\_Win\_End - T2\_max.$$

Subsequently, as the falling edge of the horizontal synchronization (HSync_Timing) has been detected in step 53, a timer TMR1 is reset (step 54), and the clock window (CLK_Win) is de-asserted (step 55). When the timer TMR1 arrives at a time equal to the beginning of the clock window (CLK_Win_Bgn) (step 56), the clock window (CLK_Win) is asserted (step 57). Afterward, when the timer TMR1 arrives at a time equal to the end of the clock window (CLK_Win_End) (step 58), the clock window (CLK_Win) is de-asserted (step 59).

Subsequently, when a predefined SFD is found or matched (step 60), the detected-SFD flag (SFD_Detected) is asserted (step 61), and the variables SFD_Lead and SFD_Lag are updated using expressions as follows:

$$SFD\_Lead += ((T5\_typ - SFD\_Lead - TMR1) * Alpha, \text{ and}$$

$$SFD\_Lag -= ((T5\_typ + SFD\_Lag - TMR1) * Alpha,$$

with Alpha being a constant that represents a weighting in the LMS algorithm, the compound operator "+=" being used to increment the rightmost variable SFD_Lead (i.e., on the right-hand side) of its expression, and the compound operator "−=" being used to decrement the rightmost variable SFD_Lag (i.e., on the right-hand side) of its expression.

Searching for the SFD in step 60 is continuously performed provided that a maximum timing constraint T5 has not been reached (step 62). A situation of no SFD being found finally, with the detected-SFD flag (SFD_Detected) remaining de-asserted (the "No" branch of step 63), may indicate, for example, a data source interruption. To facilitate the convergence in the LMS algorithm, the variables SFD_Lead and SFD_Lag are incremented by a constant value, Beta, (step 64), and the flow is performed again.

Although specific embodiments have been illustrated and described, it will be appreciated by those skilled in the art that various modifications may be made without departing from the scope of the present invention, which is intended to be limited solely by the appended claims.

What is claimed is:

1. A decoder capable of adaptively generating a clock window, comprising:
   a frame code searching unit configured to search for a match between a predefined frame code and received data bits, and to generate a frame code control signal when the predefined frame code is matched with the received data bits;
   a clock window generator adapted to determine a beginning and an end of the clock window based on a falling edge of a horizontal synchronization signal and the frame code control signal, and to determine a time difference between an actual frame code and the predefined frame code; and
   a symbol timing recovery unit is arranged to perform symbol timing recovery through received clock run-in signals within the clock window, wherein the clock window is bounded between the beginning and the end determined by the clock window generator;
   wherein the time difference is determined by using a first variable that represents a lead time of an actual leading frame code ahead of the predefined frame code and a second variable that represents a lag time of an actual lagging frame code behind the predefined frame code;
   wherein the time difference is determined at a time when the frame code control signal is asserted;
   wherein the beginning of the clock window (CLK_Win_Bgn) and the end of the clock window (CLK_Win_End) are determined as follows:

$$CLK\_Win\_Bgn = T5\_typ - T6\_typ - SFD\_Lead, \text{ and}$$

$$CLK\_Win\_End = T5\_typ - T7\_typ + SFD\_Lag,$$

with T5_typ being a predefined typical timing constraint lasting from the falling edge of the horizontal synchronization signal until an end of the predefined frame code, T6_typ being a predefined typical timing constraint lasting from the beginning of the clock window until an end of the leading frame code, T7_typ being a predefined typical timing constraint lasting from the end of the clock window until an end of the lagging frame code, SFD_Lead being the first variable, and SFD_Lag being the second variable; and
   wherein at least one of the first variable and the second variable is updated by the clock window generator using expressions as follows whenever the frame code control signal becomes asserted:

$$SFD\_Lead += ((T5\_typ - SFD\_Lead - TMR1) * Alpha, \text{ and}$$

$$SFD\_Lag -= ((T5\_typ + SFD\_Lag - TMR1) * Alpha,$$

with Alpha being a constant, TMR1 being a time period, from the falling edge of the horizontal synchronization signal until the match of the predefined frame code, the compound operator "+=" being used to increment the rightmost first variable SFD_Lead, of its expression, and the compound operator "−=" being used to decrement the rightmost second variable SFD_Lag of its expression.

2. The decoder of claim 1, wherein the values of the first variable and the second variable are subject to statistics calculation in the clock window generator.

3. The decoder of claim 1, further comprising a bit stream slicer for converting a received, signal into the data bits according to a recovered clock generated by the symbol timing recovery unit.

4. The decoder of claim 1, further comprising a packet assembler for packeting data of a data body out of the frame code searching unit into packets.

5. The decoder of claim 4, wherein the data body comprises vertical blanking interval (VBI) information.

6. A decoder capable of adaptively generating a clock window, comprising:
  a frame code searching unit configured to search for a match between a predefined frame code and received data bits, and to generate a frame code control signal when the predefined frame code is matched with the received data bits;
  a dock window generator adapted to determine a beginning and an end of the clock window based on a falling edge of a horizontal synchronization signal and the frame code control signal, and to determine a time difference between an actual frame code and the predefined frame code; and
  a symbol timing recovery unit is arranged to perform symbol timing recovery through received clock run-in signals within the clock window, wherein the clock window is bounded between the beginning and the end determined by the clock window generator;
  wherein the time difference is determined by using a first variable that represents a lead time of an actual leading frame code ahead of the predefined frame code and a second variable that represents a lag time of an actual lagging frame code behind the predefined frame code;
  wherein the time difference is determined at a time when the frame code control signal is asserted;
  wherein the beginning of the clock window (CLK_Win_Bgn) the end of the clock window (CLK_Win_End) are determined as follows:

CLK_Win_Bgn=$T5\_typ-T6\_typ-SFD\_Lead$, and

CLK_Win_End=CLK_Win_Bgn+$T2\_max$, with T5_typ being a predefined typical timing constraint lasting from the failing edge of the horizontal synchronization signal until an end of the predefined frame code, T6_typ being a predefined typical timing constraint lasting from the beginning of the clock window until an, end of the leading frame code, T2_max being a predefined maximum timing constraint lasting from the beginning of the clock window until the end of the clock window, and SFD_Lead being the first variable; and
  wherein at least one of the first variable and the second variable is updated by the clock window generator using expressions as follows whenever the frame code control signal becomes asserted:

SFD_Lead+=(($T5\_typ-SFD\_Lead-TMR1$)*Alpha, and

SFD_Lag−=(($T5\_typ+SFD\_Lag-TMR1$)*Alpha, with Alpha being a constant, TMR1 being a time period, from the falling edge of the horizontal synchronization signal until the match of the predefined frame code, the compound operator "+=" being used to increment the rightmost first variable SFD_Lead of its expression, and the compound operator "−=" being used to decrement the rightmost second, variable SFD_Lag of its expression.

7. A decoder capable of adaptively generating a clock window, comprising:
  a frame code searching unit configured to search for a match between a predefined frame code and received data bits, and to generate a frame code control signal when the predefined frame code is matched with the received data bits;
  a clock window generator adapted to determine a beginning and an end of the clock window based on a falling edge of a horizontal synchronization signal and the frame code control signal, and to determine a time difference between an actual frame code and the predefined frame code; and
  a symbol timing recovery unit is arranged to perform symbol timing recovery through received clock run-in signals within the clock window, wherein the clock window is bounded between the beginning and the end determined by the clock window generator;
  wherein the time difference is determined by using a first variable that represents a lead time of an actual leading frame code ahead of the predefined frame code and a second variable that represents a lag time of an actual lagging frame code behind the predefined frame code;
  wherein the time difference is determined at a time when the frame code control signal is asserted;
  wherein the beginning of the clock window (CLK_Win_Bgn) and the end of the clock window (CLK_Win_End) are defined as follows:

CLK_Win_End=$T5\_typ-T7\_typ+SFD\_Lag$, and

CLK_Win_Bgn=CLK_Win_End−$T2\_max$, with T5_typ being a predefined typical timing constraint lasting from the falling edge of the horizontal synchronization signal until an end of the predefined frame code, T7_typ being a predefined typical timing constraint lasting from the end of the clock window until an end of the lagging frame code, T2_max being a predefined maximum timing constraint lasting from the beginning of the clock window until the end of the clock window, and SFD_Lag being the second variable; and
  wherein at least one of the first variable and the second variable is updated by the clock window generator using expressions as follows whenever the frame code control signal becomes asserted:

SFD_Lead+=(($T5\_typ-SFD\_Lead-TMR1$)*Alpha, and

SFD_Lag−=(($T5\_typ+SFD\_Lag-TMR1$)*Alpha, with Alpha being a constant, TMR1 being a time period from the falling edge of the horizontal synchronization signal until the match of the predefined frame code, the compound operator "+=" being used to increment the rightmost first variable SFD_Lead of its expression, and the compound operator "−=" being used to decrement the rightmost second variable SFD_Lag of its expression.

* * * * *